United States Patent
Cohen

(10) Patent No.: US 9,160,564 B2
(45) Date of Patent: Oct. 13, 2015

(54) SPANNING TREE PROTOCOL FOR HYBRID NETWORKS

(75) Inventor: Etan Gur Cohen, San Francisco, CA (US)

(73) Assignee: QUALCOMM Incorporated, San Diego, CA (US)

(*) Notice: Subject to any disclaimer, the term of this patent is extended or adjusted under 35 U.S.C. 154(b) by 359 days.

(21) Appl. No.: 13/532,249

(22) Filed: Jun. 25, 2012

(65) Prior Publication Data

US 2013/0343228 A1    Dec. 26, 2013

(51) Int. Cl.
| | | |
|---|---|---|
| H04L 12/28 | (2006.01) | |
| H04L 12/44 | (2006.01) | |
| H04L 12/753 | (2013.01) | |
| H04L 12/46 | (2006.01) | |

(52) U.S. Cl.
CPC ............ *H04L 12/44* (2013.01); *H04L 12/462* (2013.01); *H04L 45/48* (2013.01)

(58) Field of Classification Search
CPC ......... H04L 12/44; H04L 45/00; H04L 45/02; H04L 45/18
USPC .................................................. 370/252–256
See application file for complete search history.

(56) References Cited

U.S. PATENT DOCUMENTS

| | | | | |
|---|---|---|---|---|
| 5,260,945 | A * | 11/1993 | Rodeheffer | 714/4.5 |
| 6,219,739 | B1 * | 4/2001 | Dutt et al. | 710/311 |
| 6,272,551 | B1 * | 8/2001 | Martin et al. | 709/250 |
| 7,154,861 | B1 * | 12/2006 | Merchant et al. | 370/254 |
| 7,177,946 | B1 * | 2/2007 | Kaluve et al. | 709/242 |
| 7,471,647 | B2 * | 12/2008 | Ge et al. | 370/256 |
| 7,653,011 | B2 * | 1/2010 | Rahman et al. | 370/256 |
| 7,760,668 | B1 * | 7/2010 | Zinjuvadia | 370/256 |
| 7,877,483 | B1 * | 1/2011 | Finn | 709/227 |
| 7,916,668 | B2 * | 3/2011 | Rose | 370/256 |
| 7,924,702 | B2 * | 4/2011 | Kulkarni et al. | 370/216 |

(Continued)

FOREIGN PATENT DOCUMENTS

WO    2014004537    1/2014

OTHER PUBLICATIONS

Abuguba S.M., "Performance Evaluation of Rapid Spanning Tree protocol by measurements and Simulation," 2006, pp. 1-61, XP002716070.

(Continued)

*Primary Examiner* — Khaled Kassim
*Assistant Examiner* — Berhanu Belete
(74) *Attorney, Agent, or Firm* — DeLizio Law, PLLC

(57) ABSTRACT

A hybrid STP can be implemented in a hybrid communication network to prevent communication loops without disabling network interfaces of hybrid devices and redundant paths of the hybrid communication network, while preserving the advantages of the hybrid communication network. Each network interface of a hybrid device can be designated as a relay interface or a non-relay interface. Each of the relay interfaces is independent of the other network interfaces of the hybrid device. The non-relay interfaces operate as a single virtual interface and do not forward packets between each other. Each network interface of the hybrid device may also be associated with a forwarding bit that indicates whether broadcast packets should be forwarded via the network interface. The hybrid device can determine whether/how to forward a packet depending on whether an ingress interface is a relay or non-relay interface and a forwarding bit value of the ingress interface.

32 Claims, 7 Drawing Sheets

(56) References Cited

U.S. PATENT DOCUMENTS

| | | | |
|---|---|---|---|
| 7,948,922 B2* | 5/2011 | Pang et al. | 370/256 |
| 8,077,633 B2* | 12/2011 | Jain et al. | 370/255 |
| 8,155,030 B2* | 4/2012 | Farkas et al. | 370/256 |
| 8,175,009 B2* | 5/2012 | Tallet et al. | 370/256 |
| 8,228,823 B2* | 7/2012 | Tallet et al. | 370/256 |
| 8,274,919 B2* | 9/2012 | Florit et al. | 370/256 |
| 8,811,168 B2* | 8/2014 | Jain et al. | 370/230 |
| 2001/0021177 A1* | 9/2001 | Ishii | 370/256 |
| 2004/0017770 A1* | 1/2004 | Higashiyama et al. | 370/223 |
| 2005/0213547 A1* | 9/2005 | Meier | 370/338 |
| 2005/0259649 A1* | 11/2005 | Smith | 370/389 |
| 2006/0268749 A1* | 11/2006 | Rahman et al. | 370/256 |
| 2007/0047472 A1* | 3/2007 | Florit et al. | 370/256 |
| 2007/0086361 A1* | 4/2007 | Allan et al. | 370/254 |
| 2007/0110024 A1* | 5/2007 | Meier | 370/351 |
| 2007/0121672 A1* | 5/2007 | Kang | 370/466 |
| 2007/0280142 A1* | 12/2007 | Meier | 370/254 |
| 2008/0215910 A1* | 9/2008 | Gabriel et al. | 714/4 |
| 2009/0022167 A1* | 1/2009 | Yumoto | 370/401 |
| 2009/0073921 A1* | 3/2009 | Ji et al. | 370/328 |
| 2009/0161584 A1* | 6/2009 | Guan | 370/256 |
| 2009/0323518 A1* | 12/2009 | Rose et al. | 370/223 |
| 2010/0271980 A1* | 10/2010 | Kini et al. | 370/256 |
| 2010/0302936 A1* | 12/2010 | Jain et al. | 370/225 |
| 2011/0222440 A1 | 9/2011 | Phillips et al. | |
| 2012/0008530 A1* | 1/2012 | Kulkarni et al. | 370/256 |
| 2012/0044837 A1* | 2/2012 | Ibanez Fernandez et al. | 370/256 |
| 2012/0113871 A1* | 5/2012 | Bulusu | 370/256 |
| 2012/0170489 A1* | 7/2012 | Farkas et al. | 370/256 |
| 2012/0224510 A1* | 9/2012 | Bulusu et al. | 370/256 |
| 2013/0242998 A1* | 9/2013 | Deshpande | 370/392 |

OTHER PUBLICATIONS

International Search Report and Written Opinion—PCT/US2013/047660—ISA/EPO—Nov. 20, 2013. 12 pages.

Veisllari R., et al., "Employing Ethernet spanning tree protocols in an integrated hybrid optical network", Transparent Optical Networks (ICTON), 2011 13TH International Conference on, IEEE, Jun. 26, 2011, pp. 1-4, XP031911984.

"IEE Std 802.1Q—2005: IEE Standard for Local and Metropolitan Area Networks—Virtual Bridged Local Area Networks", IEE Computer Society May 19, 2012 , 303 pages.

"Spanning Tree Protocol", Wikipedia, The Free Encyclopedia http://en.wikipedia.org/wiki/Spanning_Tree_Protocol Sep. 14, 2012 , 8 pages.

"PCT Application No. PCT/US2013/047660 Written Opinion", Oct. 27, 2014, 4 pages.

"PCT Application No. PCT/US2013/047660 International Preliminary Report on Patentability", Feb. 10, 2015, 8 pages.

* cited by examiner

| TYPE OF NETWORK INTERFACE | THROUGHPUT (PHY RATE) | INTERFACE WEIGHT |
|---|---|---|
| PLC INTERFACE | UNREACHABLE | 1000 |
| | PHY RATE <= 50 | 100 |
| | PHY RATE <= 100 | 50 |
| | PHY RATE > 100 | 25 |
| WLAN ACCESS POINT | 802.11b | 100 |
| | 802.11b OR 802.11a | 50 |
| | 802.11n | 25 |
| WLAN CLIENT STATION | ANY | 2* (WLAN ACCESS POINT) |
| MOCA | | 20 |

SPANNING TREE PROTOCOL FOR HYBRID NETWORKS

BACKGROUND

Embodiments of the inventive subject matter generally relate to the field of communication networks and, more particularly, to a spanning tree protocol for hybrid communication networks.

Hybrid communication networks typically comprise multiple network devices that implement multiple networking technologies (e.g., wireless local area network (WLAN) technologies, powerline communication (PLC) technologies, Ethernet, etc.). Typically, the communication mechanisms and protocol specifics (e.g., device and topology discovery, bridging to other networks, etc.) are unique to each networking technology. The multiple networking technologies are typically interconnected using bridging-capable devices that forward frames between the different network technologies and media to form a single, extended communication network. Hybrid communication networks typically present multiple frame delivery routes between any two hybrid devices.

SUMMARY

Various embodiments of a spanning tree protocol for hybrid communication networks are disclosed. In one embodiment, one or more spanning tree operations are executed at a first of a plurality of network devices of a hybrid communication network. One or more of a root interface, at least one alternate root interface, and at least one designated interface of the first of the plurality of network devices are determined at the first of the plurality of network devices, in response to executing the one or more spanning tree operations. At the first of the plurality of network devices, the root interface and the alternate root interfaces are identified as non-relay interfaces and the at least one designated interface is identified as a relay interface. In response to receiving a packet at a first interface of the first of the plurality of network devices, the packet is forwarded via one or more other interfaces of the first of the plurality of network devices based, at least in part, on whether the first interface is a relay interface or a non-relay interface.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
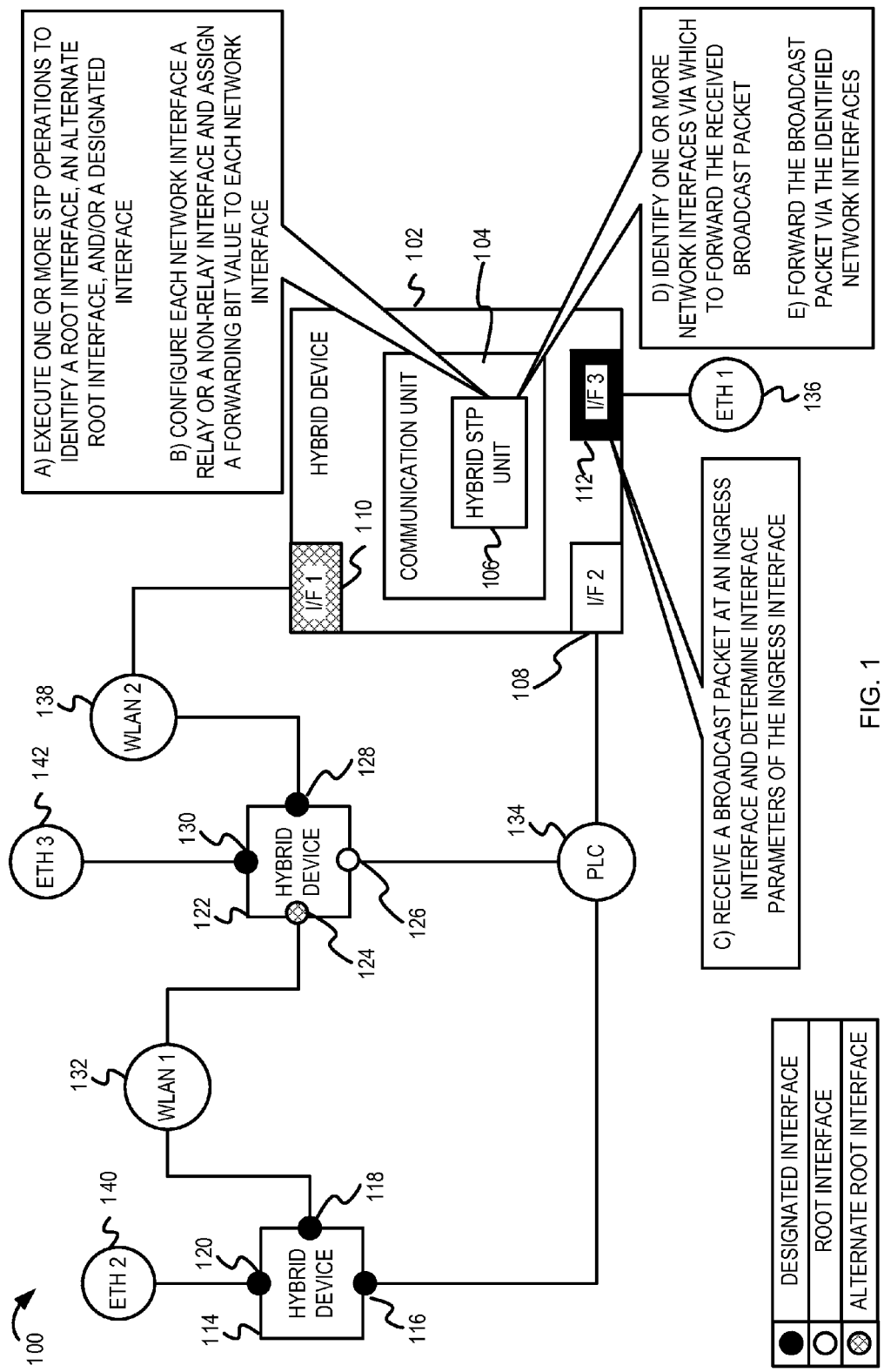
FIG. 1 is an example conceptual diagram illustrating a hybrid spanning tree protocol in a hybrid communication network.

The description that follows includes exemplary systems, methods, techniques, instruction sequences, and computer program products that embody techniques of the present inventive subject matter. However, it is understood that the described embodiments may be practiced without these specific details. For instance, although examples refer to implementing a hybrid spanning tree protocol ("hybrid STP" or "HSTP") using shared powerline communication network (e.g., a HomePlug® AV network); in other embodiments, other suitable shared communication networks (e.g., Multimedia over Coax Alliance (MoCA®) networks, WLAN, HomePlug Green PHY networks, etc.) can be employed for implementing the hybrid spanning tree protocol. Furthermore, although examples refer to a modification of a rapid spanning tree protocol (RSTP) to generate the hybrid spanning tree protocol; in other embodiments, other variants of the spanning tree protocol (e.g., virtual LAN spanning tree protocol (VSTP), etc.) can be used as the basis of the hybrid spanning tree protocol. In other instances, well-known instruction instances, protocols, structures, and techniques have not been shown in detail in order not to obfuscate the description.

Typically, a traditional spanning tree protocol (STP) or its variants (e.g., RSTP, VSTP, etc.) can be employed to identify and eliminate communication loops in a communication network by identifying redundant paths (on which packets can be transmitted or received) and by disabling/blocking communication via the identified redundant paths. However, a hybrid communication network comprises hybrid devices, which have multiple network interfaces that couple the hybrid device to corresponding multiple communication networks (e.g., an Ethernet, a WLAN, a MoCA network, a PLC network, etc.). Consequently, the hybrid communication network can comprise multiple redundant paths between hybrid devices. These multiple redundant paths can result in broadcast storms or duplicate packet delivery. The traditional STP typically operates by disabling redundant paths in a communication network to eliminate the broadcast storms and duplicate packet delivery. However, disabling the redundant paths in the hybrid communication network can defeat the purpose of the hybrid communication network, which is to use the redundant paths to provide additional throughput and robustness.

In some embodiments, hybrid spanning tree protocol (hybrid STP) operations can be executed to extend the traditional STP to hybrid communication networks to prevent communication loops without disabling network interfaces of the hybrid devices and without disabling redundant paths of the hybrid communication network. As will be further described below, each network interface of a hybrid device (e.g., a hybrid bridge) can be designated as a "relay" interface or a "non-relay" interface. Each of the relay interfaces is an atomic unit that is independent of the other network interfaces of the hybrid device. For each hybrid device, the combination of the non-relay interfaces of that hybrid device is considered a single virtual interface. In other words, for each hybrid device, the non-relay interfaces do not relay/transmit packets between each other. Furthermore, each network interface of the hybrid device may also be associated with a forwarding bit that indicates whether broadcast packets should be forwarded or received via the network interface, thus reducing the probability of duplicate packet delivery. Thus, the hybrid STP can define the behavior of the hybrid device that is not based on blocking/disabling network interfaces to all traffic but only to a particular type of traffic (e.g., broadcast traffic, unmanaged multicast traffic, and unknown unicast traffic). Implementing the hybrid STP in the hybrid communication network can prevent communication loops and broadcast storms in the hybrid communication network and can minimize the probability of duplicate packet delivery without disabling redundant paths in (and without losing the advantages of) the hybrid communication network.

FIG. 1 is an example conceptual diagram illustrating an implementation of a hybrid STP in a hybrid communication network 100. The hybrid communication network 100 includes a powerline communication (PLC) network 134, two WLANs 132 and 138, and three Ethernets 136, 140, and 142. Each of the WLANs 132 and 138 can be governed by their respective access points (not shown). The hybrid communication network 100 comprises hybrid devices 102, 114, and 122. The hybrid device 102 comprises a communication unit 104. The communication unit 104 comprises a hybrid STP unit 106. Although not depicted in FIG. 1, the hybrid devices 114 and 122 can also comprise a communication unit and a hybrid STP unit as depicted for the hybrid device 102. The communication units associated with each of the hybrid devices 102, 114, and 122 can be implemented on a system on a chip (SoC), an application-specific integrated circuit (ASIC), or other suitable type of integrated circuit (IC). Furthermore, in some embodiments, the communication units associated with each of the hybrid devices 102, 114, and 122 can be implemented as one or more integrated circuits on a circuit board (e.g., including a network interface card, at least one processor, and/or other processing units). In FIG. 1, the hybrid device 102 comprises three network interfaces 108, 110, and 112 that enable the hybrid device 102 to connect to the PLC network 134, the WLAN 138, and the Ethernet 136 respectively. The hybrid device 114 comprises three network interfaces 116, 118, and 120 that enable the hybrid device 114 to connect to the PLC network 134, the WLAN 132, and the Ethernet 140 respectively. The hybrid device 122 comprises four network interfaces 124, 126, 128, and 130. The network interfaces 126 and 130 enable the hybrid device 122 to connect to the PLC network 134 and the Ethernet 142 respectively. The network interfaces 124 and 128 enable the hybrid device 122 to connect to the WLANs 132 and 138 respectively. Furthermore, as depicted in FIG. 1, the network interfaces 108, 116, and 126 of the hybrid devices 102, 114, and 122 respectively are coupled with each other via the PLC network 134. The network interface 118 of the hybrid device 114 is coupled with the network interface 124 of the hybrid device 122 via the WLAN 132. The network interface 110 of the hybrid device 102 is coupled with the network interface 128 of the hybrid device 122 via the WLAN 138.

It should be noted that in other embodiments, the hybrid devices 102, 114, and 122 can comprise other suitable number of network interfaces and can connect to other suitable types of communication networks (e.g., 2.4 GHz WLAN, 5 GHz WLAN, HomePlug AV network, Ethernet, MoCA network, HomePlug Green PHY network, etc.). In some implementations, the hybrid devices 102, 114, and 122 can each be an electronic device such as a laptop computer, a tablet computer, a mobile phone, a smart appliance, a gaming console, an access point, or other suitable electronic devices with suitable communication capabilities (e.g., WLAN communication capabilities, powerline communication capabilities, Ethernet communication capabilities, etc.). In some embodiments, in addition to powerline communication protocols, WLAN communication protocols, and Ethernet communication protocols, communication units of the hybrid devices 102, 114, and 122 can implement other protocols and functionality to enable other types of communications (e.g., Bluetooth®, WiMAX, etc.).

In some embodiments, the hybrid STP unit 106 can execute operations described below to determine whether/how to forward a broadcast packet, an unmanaged multicast packet, or an unknown unicast packet received at a network interface ("ingress interface") of the hybrid device 102. The broadcast packet may be identified as a packet where the destination address is set to DA=FF:FF:FF:FF:FF:FF. The unmanaged multicast packet may be a multicast packet that is not managed by Internet Group Management Protocol (IGMP) or Multicast Listener Discovery (MLD) protocol. In some embodiments, if the address of the destination device for a unicast packet is unknown, the unicast packet can be flooded on (transmitted via) all interfaces of the transmitting/forwarding device. Such a unicast packet with an unknown destination device address is referred to as an "unknown unicast" packet. The hybrid STP unit 106 can first group subsets of the network interfaces of the hybrid device 102 based on identifying which of the network interfaces should be permitted to forward packets (as will be further described below in stages A-B). In response to receiving a packet at an ingress interface, the hybrid STP unit 106 can determine whether/how to forward the received packet (as will be further described below in stages C-E).

At stage A, the hybrid STP unit 106 executes one or more STP operations at the hybrid device 102 to identify a root interface, an alternate root interface, and/or a designated interface of the hybrid device 102. In some embodiments, the hybrid STP unit 106 can comprise a traditional RSTP unit (or another processing unit that executes other suitable variants of the traditional STP). The traditional RSTP unit can execute RSTP operations to determine the root interface, at least one alternate root interface, and/or at least one designated interface of the hybrid device 102, as will be described below in FIGS. 2, 4A, and 4B. It should be noted that in some embodiments, the hybrid STP unit 106 may only identify the root interface of the hybrid device 102. The hybrid device 102 may neither comprise an alternate root interface nor comprise a designated interface. In other embodiments, the hybrid device 102 may comprise a root interface and one or more alternate root interfaces. The hybrid device 102 may not comprise any designated interfaces. In yet another embodiment, the hybrid device 102 may comprise a root interface and one or more designated interfaces. The hybrid device 102 may not comprise any alternate root interfaces. With reference to the example of FIG. 1, the hybrid STP unit 106 may determine that the PLC interface 108 is a root interface, that the WLAN interface 110 is an alternate root interface, and that the Ethernet interface 112 is a designated interface. Likewise, a hybrid STP unit (not shown) of the hybrid device 122 can configure the PLC interface 126 as a root interface, the WLAN interface 124 as an alternate root interface, the Ethernet interface 130 as a designated interface, and the WLAN interface 128 as a designated interface. A hybrid STP unit (not shown) of the hybrid device 114 can configure the PLC interface 116, the WLAN interface 118, and the Ethernet interface 120 as designated interfaces. Additionally, in some embodiments, the hybrid STP unit 106 can also identify (based on executing the RSTP operations) a root bridge of the hybrid communication network 100, as will be described below with reference to FIGS. 2 and 3. In the example of FIG. 1, the hybrid device 114 can be configured as the root bridge of the hybrid communication network 100.

At stage B, each network interface of the hybrid device 102 is configured as a relay or a non-relay interface and a forwarding bit value is determined for each network interface. In some embodiments, in accordance with the hybrid STP, each network interface of the hybrid device 102 can be associated with two interface parameters—a group type and a forwarding bit. The hybrid STP unit 106 can configure each network interface of the hybrid device 102 as a relay interface or a non-relay interface. Each of the relay interfaces can be an atomic unit that is independent of the other network interfaces of the hybrid device 102. This means that any broadcast packet (or an unmanaged multicast packet or an unknown unicast packet) arriving on the relay interface is forwarded to other relay interfaces for re-transmission. The non-relay interfaces of the hybrid device 102 form a special group. For the hybrid device 102, the group of non-relay interfaces is considered a single virtual interface. In other words, the non-relay interfaces of the hybrid device 102 do not relay/transmit packets between each other. This means that any broadcast packet (or unmanaged multicast packet or unknown unicast packet) that is received at a non-relay interface of the hybrid device 102 is forwarded only to the relay interfaces of the hybrid device 102 and is not forwarded to the other non-relay interfaces of the hybrid device 102. Configuring all the hybrid devices 102, 114, and 122 of the hybrid communication network 100 in this manner (e.g., using the hybrid STP operations described herein), can prevent broadcast storms. Furthermore, a packet that is received at one non-relay interface of the hybrid device 102 is deemed to have been received at all other non-relay interfaces of the hybrid device 102 and is therefore, not forwarded via the other non-relay interfaces of the hybrid device 102. Referring to FIG. 1, there are two paths between the hybrid device 114 and the hybrid device 122—a WLAN path and a PLC path. Ordinarily, the presence of two paths could result in a loop between the hybrid devices 114 and 122. But, using the hybrid STP, the WLAN interface 124 of the hybrid device 122 can be identified as the alternate root interface and the PLC interface 126 of the hybrid device 122 can be identified as the root interface. In accordance with the hybrid STP, the WLAN interface 124 and the PLC interface 126 of the hybrid device 122 can be configured as non-relay interfaces. This means that even if the hybrid device 122 receives a broadcast packet (from the hybrid device 114) on both the interfaces 124 and 126, the hybrid device 122 may not re-broadcast the received packet via other non-relay interfaces (i.e., the hybrid device 122 will not re-broadcast via the WLAN interface 124), thus preventing a loop between the hybrid devices 114 and 122.

The forwarding bit associated with a network interface indicates whether a broadcast packet (or unmanaged multicast packet or unknown unicast packet) should be transmitted/received via the network interface, thus reducing the probability of duplicate packet delivery. In some embodiments, if a forwarding bit value of "1" is assigned to an ingress interface, this can indicate that broadcast packets received at the ingress interface should be forwarded to other network interfaces with a forwarding bit value of "1." If a forwarding bit value of "0" is assigned to the ingress interface, this can indicate that broadcast packets received at the ingress interface should not be forwarded to any interface of the hybrid device 102 (e.g., should be dropped). The hybrid STP unit 106 can accordingly assign a forwarding bit value of "1" to all the relay interfaces, a forwarding bit value of "1" to one network interface from the group of non-relay interfaces, and a forwarding bit of "0" to the other network interfaces from the group of non-relay interfaces. It is noted that in other embodiments, other suitable values (or flag bits) can be assigned to indicate whether the network interface is a relay or a non-relay interface, whether packets received at the network interface should be forwarded, and whether packets should be forwarded via the network interface.

Referring to the example of the hybrid device 102 of FIG. 1, the hybrid STP unit 106 can identify the network interfaces 108 and 110 as the root interface and the alternate root interface respectively. The hybrid STP unit 106 can configure the network interfaces 108 and 110 as non-relay interfaces. The hybrid STP unit 106 can identify the network interface 112 as a designated interface. The hybrid STP unit 106 can configure the network interface 112 as a relay interface. Thus, the alternate root interfaces that are traditionally blocked in the conventional STP are grouped into a non-relay interface group along with the root interface. As described above, the non-relay interface group may be defined so that a packet received at one non-relay interface is not forwarded via other non-relay interfaces and a packet is broadcast via only one non-relay interface instead of via all the non-relay interfaces. Configuring the hybrid STP unit 106 in this manner can ensure that communication loops are avoided in the hybrid communication network without the need for blocking the alternate root interfaces, thus preserving the "hybrid" functionality of the hybrid device 102. Likewise, the hybrid device 114 can configure its designated interfaces 116, 118, and 120 as relay interfaces. The hybrid device 122 can configure its designated interfaces 128 and 130 as relay interfaces, can configure its root interface 126 as a non-relay interface, and can configure its alternate root interface as a non-relay interface.

It should be noted that in some embodiments, each network interface of the hybrid device 102 can also be associated with a third parameter, which indicates whether the network interface is "blocked." The network interface may be marked as blocked (a rare occurrence) if the communication loops cannot be removed (e.g., because of the presence of bridges that do not support the hybrid STP) even after the hybrid STP operations are executed. It is noted that if the PLC interface 108 is configured as the designated interface (and consequently a relay interface), a loop may be introduced between the hybrid devices 102 and 122 along the path that flows from the WLAN interface 128 of the hybrid device 122, to the WLAN interface 110 of the hybrid device 102, to the PLC interface 108 of the hybrid device 102, and finally to the PLC interface 126 of the hybrid device 122. In some embodiments, the operations of FIGS. 2-5 can be executed to ensure that the appropriate network interfaces are selected a relay and non-relay interfaces.

At stage C, the hybrid device 102 receives a broadcast packet at a network interface ("ingress interface") of the hybrid device 102 and determines interface parameters associated with the ingress interface. In the example of FIG. 1, the hybrid device 102 receives a broadcast packet at the network interface 108. In response to receiving the broadcast packet (or a multicast packet or an unknown unicast packet), the hybrid STP unit 106 can determine whether the ingress interface 108 is a relay interface or a non-relay interface. In response to receiving the broadcast packet (or an unmanaged multicast packet, the hybrid STP unit 106 can also determine whether a forwarding bit associated with the ingress interface is set to "0" or "1." In some embodiments, the hybrid STP unit 106 can access a database (or another suitable storage device/construct) to determine the forwarding bit value assigned to the ingress interface 108 and to determine whether the ingress interface 108 is a relay interface or a non-relay interface. For example, the hybrid STP unit 106 may maintain a list of all the network interfaces associated with the hybrid device 102, a corresponding first bit that indicates whether the network interface is a relay interface or a non-relay interface, and a corresponding second bit that comprises the forwarding bit value.

At stage D, the hybrid STP unit 106 identifies one or more network interfaces via which to forward the received broadcast packet. As will be further described in FIG. 6 if the hybrid STP unit 106 determines that the ingress interface 108 is a relay interface, the hybrid STP unit 106 can determine to forward the received broadcast packet via one representative non-relay interface (e.g., the root interface) and other relay interfaces of the hybrid device 102. If the hybrid STP unit 106 determines that the ingress interface 108 is a non-relay interface, the hybrid STP unit 106 can determine to forward the received broadcast packet via the relay interfaces of the hybrid device 102. If the ingress interface 108 is a non-relay interface, the hybrid STP unit 106 can determine to not forward the received broadcast packet via other non-relay interfaces of the hybrid device 102.

At stage E, the hybrid device 102 forwards the received broadcast packet via the network interfaces identified at stage D. It should be noted that the broadcast packet may be forwarded via those network interfaces of the hybrid device 102 that have a forwarding bit value of "1." Furthermore, in some embodiments, the received packet may not be forwarded via any network interface of the hybrid device 102 if a forwarding bit value of "0" is assigned to the ingress interface 108.

Figure 2:
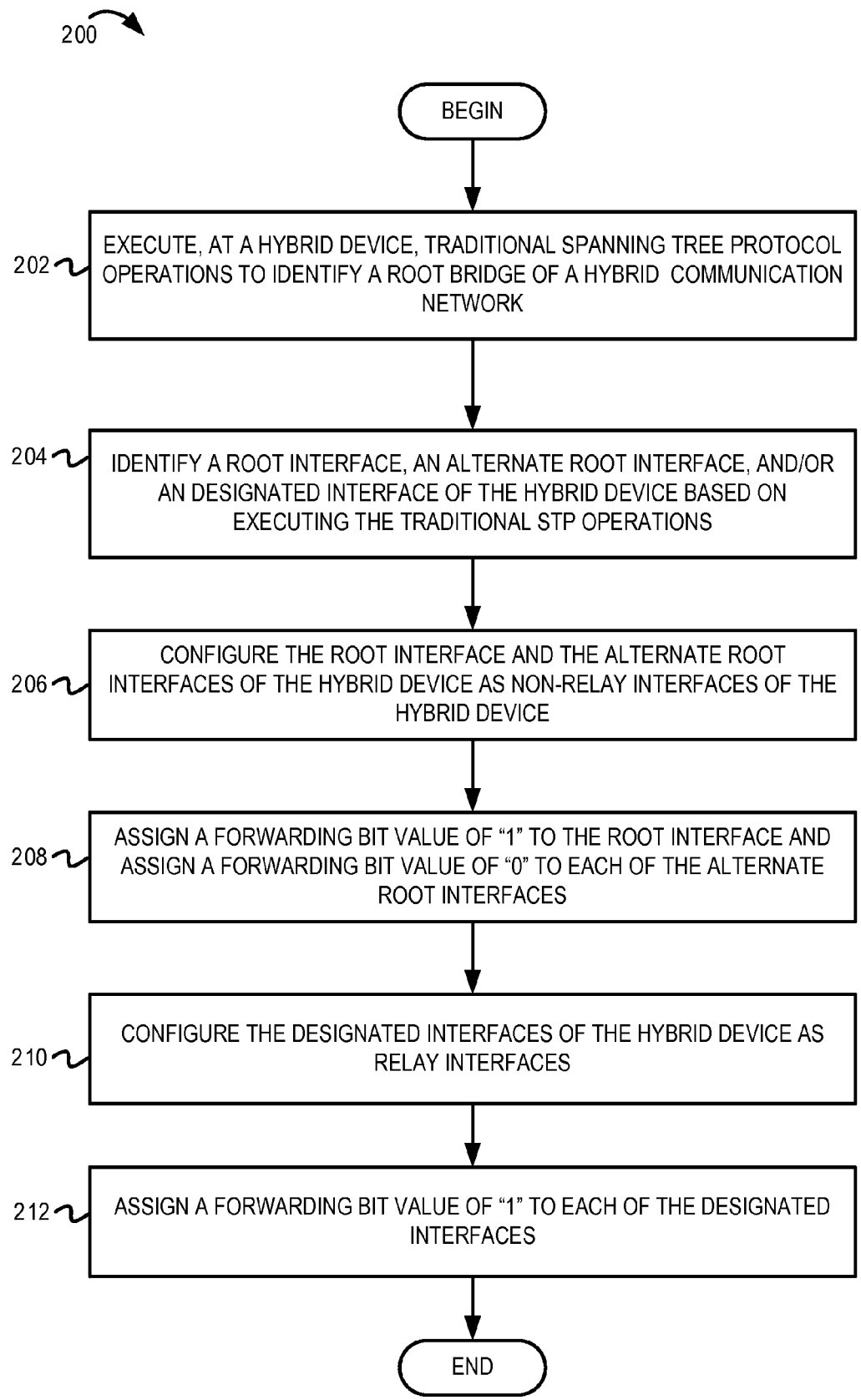
FIG. 2 is a flow diagram illustrating example operations of a hybrid spanning tree protocol in a hybrid communication network.

FIG. 2 is a flow diagram ("flow") 200 illustrating example operations of a hybrid spanning tree protocol in a hybrid communication network. The flow 200 begins at block 202.

At block 202, traditional spanning tree protocol operations are executed at a hybrid device of a hybrid communication network to identify a root bridge of the hybrid communication network. With reference to the example of FIG. 1, a hybrid STP unit 106 of the hybrid device 102 can execute a traditional RSTP algorithm on the hybrid communication network 100 to identify a root bridge of the hybrid communication network 100. A root bridge can be a root node of a spanning tree associated with the hybrid communication network 100. Thus, any communication arriving at the hybrid communication network 100 or leaving the hybrid communication network 100 typically passes through the root bridge. Various factors, such as whether a hybrid device is connected to the hybrid communication network's gateway, a type of the hybrid device (e.g., whether the hybrid device is a WLAN access point, a PLC central coordinator (CCo), a network coordinator), etc. can be taken into consideration in selecting the root bridge of the hybrid communication network 100, as will be further described with reference to FIG. 3. It should be noted that in other embodiments, other suitable techniques can be employed for selecting the root bridge of the hybrid communication network 100. In some embodiments, the traditional RSTP operations can also be executed to determine a "designated bridge" for each network segment of the hybrid communication network 100. Any packet arriving at the network segment or leaving the network segment typically passes though the designated bridge associated with the network segment. The designated bridge can be another hybrid device of the hybrid communication network 100 that may or may not be different from the root bridge. The flow continues at block 204.

At block 204, a root interface, at least one alternate root interface, and/or at least one designated interface are identified for the hybrid device based on executing the traditional STP operations. For example, the hybrid STP unit 106 can execute the traditional STP operations to select one of the network interfaces (e.g., the network interface 108) of the hybrid device 102 as the root interface of the hybrid device 102. It is noted that a root interface can be determined for each hybrid device in the hybrid communication network 100. The root interface 108 can be a network interface via which the hybrid device 102 communicates with the root bridge 114 of the hybrid communication network 100. As will be described below in FIGS. 4A and 4B, selection of the root interface 108 of the hybrid device 102 can be biased/weighted based on the throughput available at each network interface, the type of communication network to which each network interface couples the hybrid device 102, and the type of the hybrid device 102 (e.g., whether the hybrid device 102 is an access point or a client station). The hybrid STP unit 106 can select one or more of the network interfaces of the hybrid device 102 as the alternate root interfaces of the hybrid device 102. One of the alternate root interfaces can be "promoted" to be the root interface of the hybrid device 102 in case the original root interface of the hybrid device 102 fails. The hybrid STP unit 106 can also select one or more designated interfaces of the hybrid device 102. Each of the designated interfaces can be associated with corresponding one or more network segments. In other words, to transmit a packet to a particular network segment, the hybrid device 102 can transmit the packet via the designated interface associated with that network segment. In some embodiments, the hybrid device 102 can also comprise one or more backup interfaces that backup the designated interfaces in case the designated interfaces fail. It should be noted that in some embodiments, the hybrid device 102 may only comprise a root interface and may not comprise any alternate root interfaces or designated interfaces. In other embodiments, the hybrid device 102 may only comprise a root interface and one or more alternate root interfaces. In yet another embodiment, the hybrid device 102 may only comprise a root interface and one or more designated interfaces. The flow continues at block 206.

At block 206, the root interface and the alternate root interfaces of the hybrid device are configured as non-relay interfaces. As described above in FIG. 1, grouping the root interface 108 and the alternate root interfaces 110 as non-relay interfaces can indicate that the root interface 108 and the alternate root interfaces 110 act as a single virtual interface and do not relay/re-transmit packets between each other. The flow continues at block 208.

At block 208, a forwarding bit value of "1" interface is assigned to the root and a forwarding bit value of "0" interface is assigned to the alternate root interfaces. Thus, the root interface 108 of the hybrid device 102 can be a non-relay interface with a forwarding bit value of "1." The alternate root interfaces 110 can each be a non-relay interface with a forwarding bit value of "0." In other words, instead of disabling the alternate root interfaces (in accordance with the traditional RSTP operations), the alternate root interfaces 110 can be identified as non-relay interfaces and can be assigned a forwarding bit value of "0." This can enable the alternate root interfaces to be used for transmitting/receiving unicast packets in the hybrid communication network 100 but can ensure that broadcast packets are not re-transmitted through the alternate root interfaces. This can eliminate the probability of communication loops and can minimize the probability of duplicate packet delivery in the hybrid communication network 100, while maintaining the functionality of the hybrid communication network 100. The flow continues at block 210.

At block 210, the designated interfaces of the hybrid device are configured as relay interfaces. For example, the designated interfaces 112 of the hybrid device 102 can be configured as relay interfaces. As described above in FIG. 1, each of the relay interfaces can be atomic units and can be independent of each other. Accordingly, receiving a broadcast packet at one of the relay interfaces may not preclude re-transmission of the packet via other relay interfaces. The flow continues at block 212.

At block 212, a forwarding bit value of "1" is assigned to each of the designated interfaces. Thus, each of the designated interfaces can be a relay interface with a forwarding bit value of "1." This can ensure that any packet received at one of the relay interfaces (or a non-relay interface) is forwarded via other relay interfaces of the hybrid device 102. From block 212, the flow ends.

Figure 6:
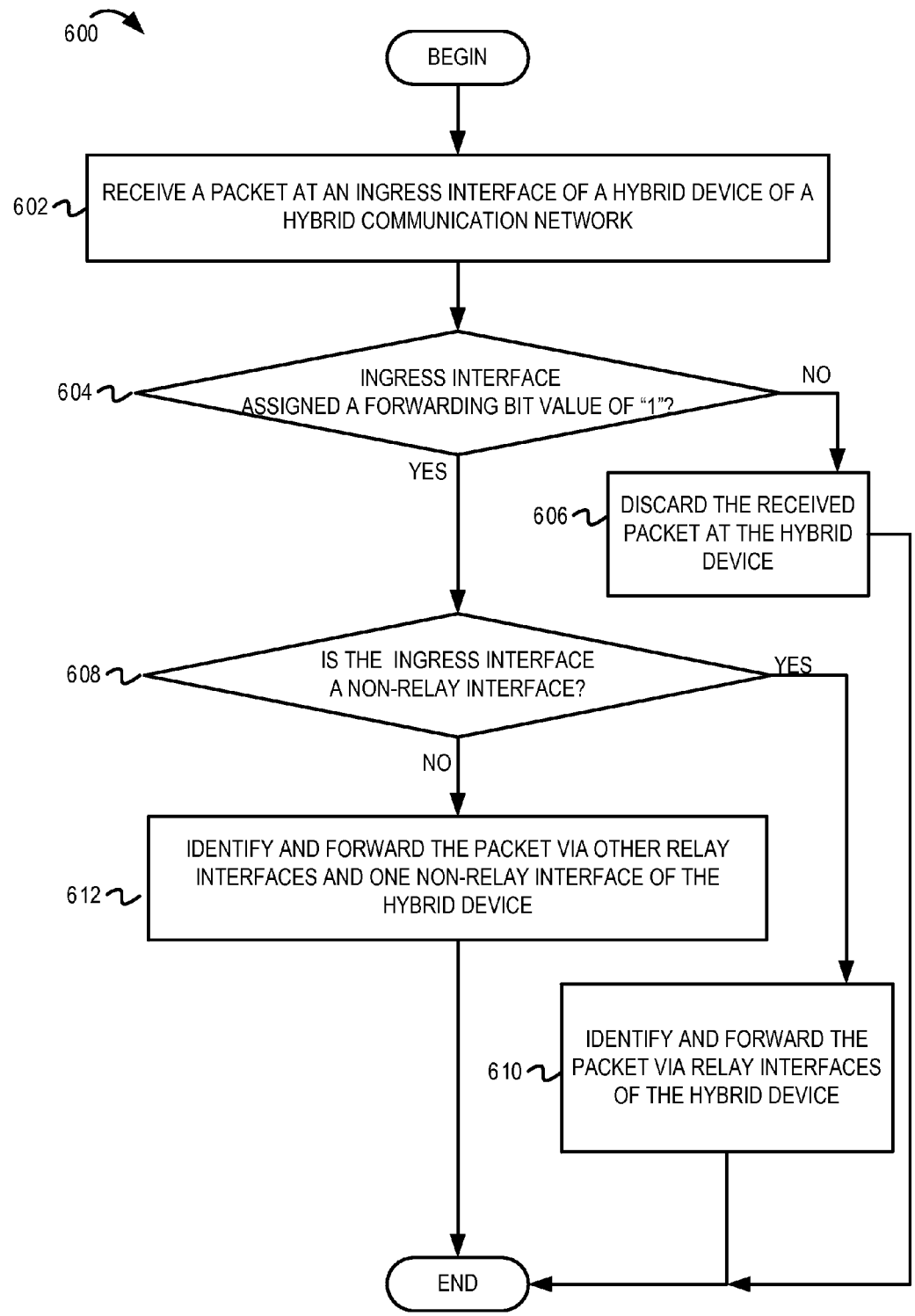
FIG. 6 is a flow diagram illustrating example operations for determining how to forward a packet received at a hybrid device.

As will be further described in FIG. 6, the hybrid device 102 can determine whether or not to forward a broadcast packet (or an unmanaged multicast packet or an unknown unicast packet) received on one of its network interfaces (the ingress interface) based on the forwarding bit value assigned to the ingress interface and based on whether the ingress interface is a relay or a non-relay interface. It should be noted that in some embodiments, as described above in FIG. 1, the hybrid device 102 can comprise backup interfaces due to improper connections by a non-hybrid (or "legacy") device or a hybrid device that does not implement the hybrid STP. In this embodiment, the hybrid STP unit 106 can disable the backup interfaces of the hybrid device 102 to prevent broadcast storms and duplicate packet delivery in the hybrid communication network 100.

Figure 3:
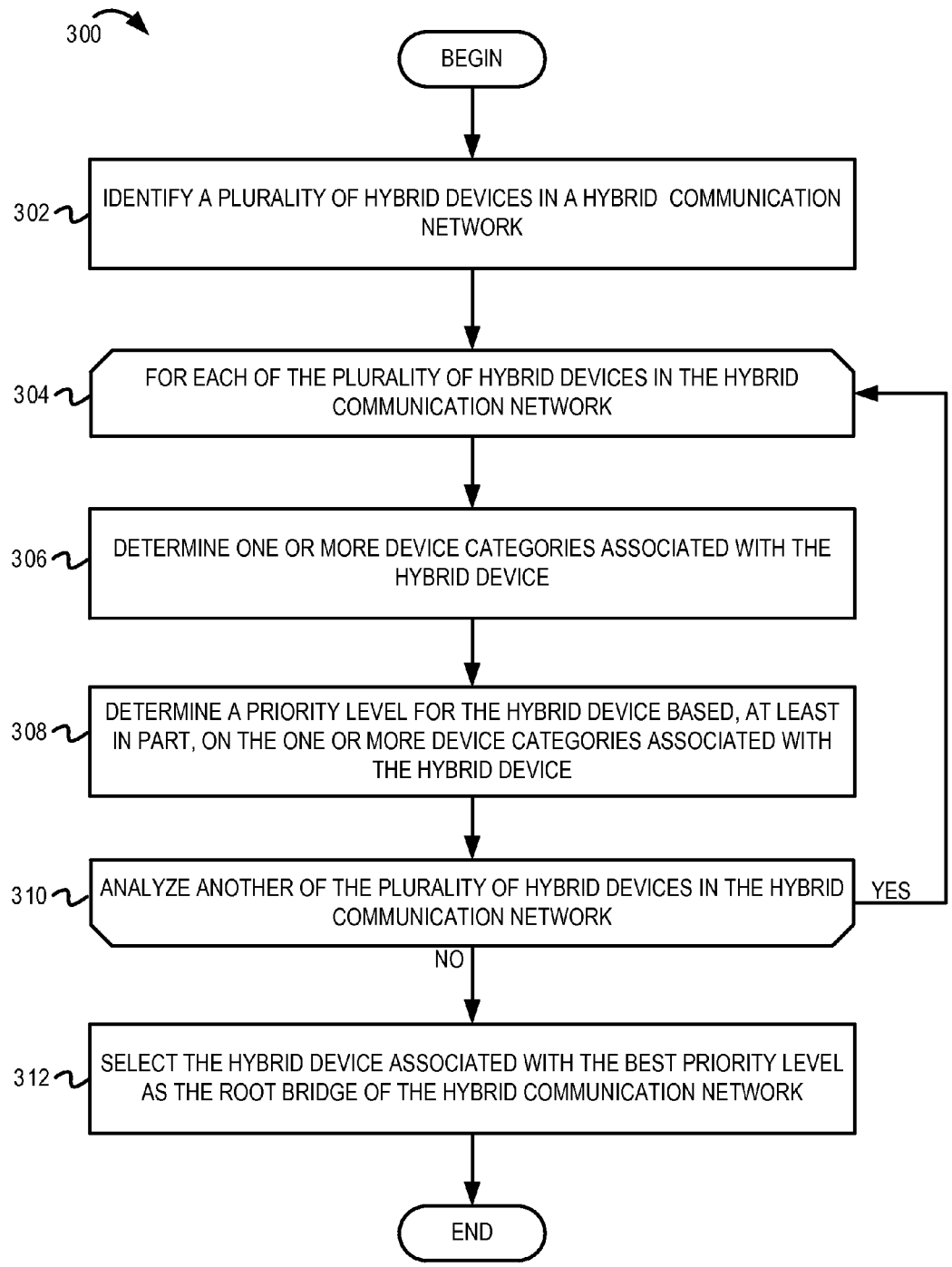
FIG. 3 is a flow diagram illustrating example operations for selecting a root bridge of a hybrid communication network.

FIG. 3 is a flow diagram 300 illustrating example operations for selecting the root bridge of a hybrid communication network. The flow 300 begins at block 302.

At block 302, a plurality of hybrid devices is identified in a hybrid communication network. In some embodiments, operations for identifying the root bridge can be executed by one of the hybrid devices 102 in the hybrid communication network 100. After identifying the root bridge, the hybrid device 102 can notify other hybrid devices of the root bridge selected for the hybrid communication network 100. In another embodiment, operations for identifying the root bridge can be executed by some/all of the hybrid devices in the hybrid communication network 100. The flow continues at block 304.

At block 304, a loop begins for each of the plurality of hybrid devices in the hybrid communication network. Each of the hybrid devices can be analyzed to determine how to bias the selection of the root bridge of the hybrid communication network 100. As will be further described below, various factors can be taken into consideration to bias/affect selection of the root bridge for the hybrid communication network 100. These factors can include A) the topology of the hybrid communication network 100, B) whether the hybrid device is a gateway or is connected to the gateway of the hybrid communication network 100, C) whether the hybrid device is a WLAN access point, a PLC central coordinator, or another coordinator device. The flow continues at block 306.

At block 306, one or more device categories are determined for the hybrid device. For example, it may be determined whether the hybrid device is a gateway of the hybrid communication network 100, whether an interface of the hybrid device is connected to a gateway of the hybrid communication network 100, whether the hybrid device is a WLAN access point, whether the hybrid device is a PLC central coordinator, etc. It is noted that the hybrid device can fall into multiple device categories. For example, a hybrid device can be a WLAN access point that is connected to the gateway of the hybrid communication network 100. The flow continues at block 308.

At block 308, a priority level is determined for the hybrid device based, at least in part, on the one or more device categories associated with the hybrid device. Various factors such as, whether the hybrid device 102 is connected to the gateway of the hybrid communication network 100, whether the hybrid device 102 is a WLAN access point, a PLC central coordinator (CCo), a MoCA network coordinator, etc. can be taken into consideration in assigning weights and for ultimately calculating the priority level associated with the hybrid device 102. In some embodiments, a higher weight may be assigned to the hybrid device 102 that is (or that is connected to) a gateway of the hybrid communication network 100. Because traffic/communications from external communications networks arrive at the hybrid communication network 100 through the gateway, designating the hybrid device that is (or that is connected to) the gateway as the root bridge can place the hybrid at the top of the spanning tree. This can minimize the need for backtracking through the spanning tree and can reduce the number of hops that a packet traverses to reach a destination hybrid device in the hybrid communication network 100. In some embodiments, a higher weight may be assigned to the hybrid device 102 that is a WLAN access point and a lower weight may be assigned to the hybrid device 102 that is a WLAN client device. In some embodiments, a higher weight may be assigned to the hybrid device 102 that is a PLC central coordinator and a lower weight may be assigned to the hybrid device 102 that is a MoCA network coordinator. In one example, if a DHCP server (or a gateway or a router) is detected on an Ethernet interface of the hybrid device 102, the hybrid device 102 may be assigned a constituent weight of 0x4. If the hybrid device 102 is a WLAN access point, the hybrid device 102 may be assigned a constituent weight of 0x2. If the hybrid device 102 is a PLC central coordinator and/or another suitable network coordinator, the hybrid device 102 may be assigned a constituent weight of 0x1. In this example, the hybrid device 102 that is connected to the gateway may be given precedence over the hybrid devices that are not connected to the gateway. In some embodiments, the priority level of the hybrid device 102 can be determined by subtracting the sum of the constituent weights from (0x8), as depicted in Eq. 1.

$$\text{Hybrid device priority level}=(0x8)-\Sigma(\text{constituent weights}) \qquad \text{Eq. 1}$$

In one example, if the hybrid device 102 may be a WLAN access point and may also be connected to the gateway of the hybrid communication network 100. In this example, a first constituent weight of 0x4 may be assigned to the hybrid device 102 because the hybrid device 102 is connected to the gateway of the hybrid communication network 100. Additionally, a second constituent weight of 0x2 may be assigned to the hybrid device 102 because the hybrid device 102 is also a WLAN access point. The priority level associated with the hybrid device 102 may be calculated as, priority level=(0x8)−(0x4+0x2)=(0x2). It should be noted that in other embodiments, other suitable device categories can be taken into consideration, different weights can be assigned to each device categories, and other suitable techniques can be employed to assign a priority value to the hybrid device 102 for root bridge selection. The flow continues at block 310.

At block 310, it is determine whether to analyze another hybrid device of the hybrid communication network. If it is determined to analyze another hybrid device of the hybrid communication network, the flow loops back to block 304, where the priority level associated with the next hybrid device can be determined. Otherwise, the flow continues at block 312.

At block 312, the hybrid device is selected as the root bridge of the hybrid communication network based, at least in part, on the priority level assigned to each of the hybrid devices in the hybrid communication network. In some embodiments, the hybrid device associated with the lowest priority level can be selected as the root bridge of the hybrid communication network 100. Typically, the constituent weights assigned to each type of the hybrid device (e.g., whether the hybrid device is a WLAN access point, a centralized coordinator, etc.) can be selected to ensure that priority level of each of the hybrid devices is different. However, in some embodiments, multiple hybrid devices may be associated with the same lowest priority level (e.g., because they are the same type of hybrid device). Various mechanisms can be employed to select the root bridge if multiple hybrid devices are associated with the same lowest priority level. For example, one of the multiple hybrid devices with the same lowest priority level may be randomly selected as the root bridge. From block 312, the flow ends.

Figures 4A, 4B:
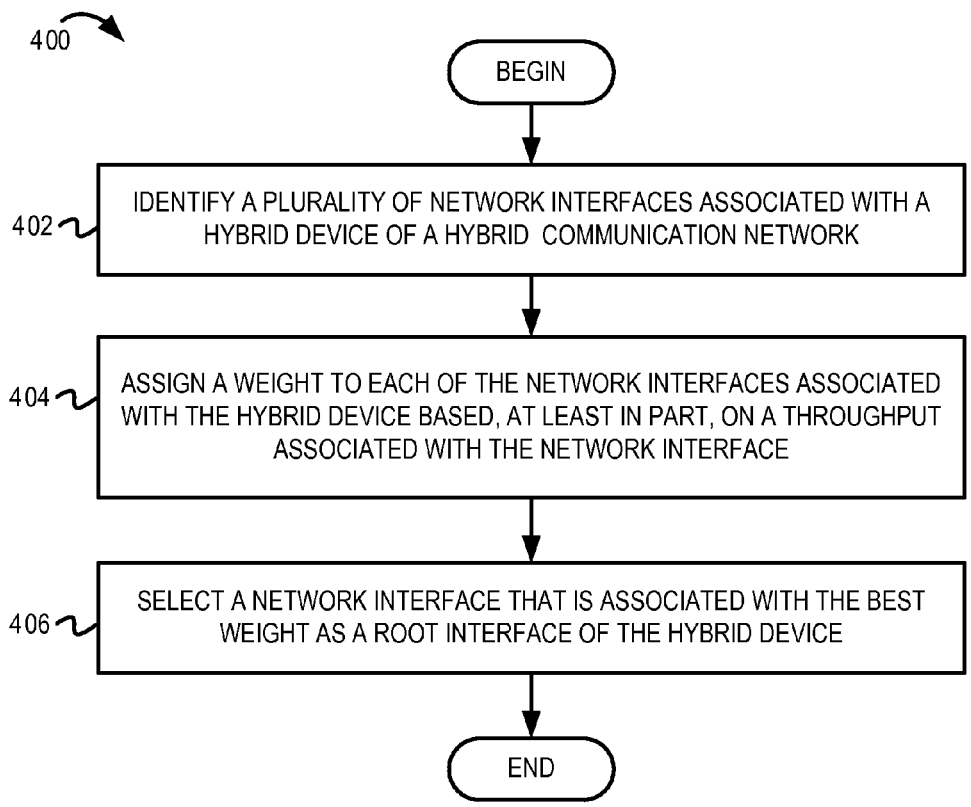
FIG. 4A is a flow diagram illustrating example operations for identifying a root interface of a hybrid device.
FIG. 4B depicts a table including example weights that are assigned to each type of network interface of the hybrid device.

FIG. 4A is a flow diagram 400 illustrating example operations for identifying a root interface of a hybrid device. The flow 400 begins at block 402.

At block 402, a plurality of network interfaces associated with a hybrid device of a hybrid communication network are identified. Referring to the example of FIG. 1, the hybrid STP unit 106 can identify the plurality of network interfaces 108, 110, and 112 associated with the hybrid device 102. As will be further described below, each network interface (also referred to as a port) of the hybrid device 102 can be weighted and analyzed to identify the root interface of the hybrid device 102. The flow continues at block 404.

At block 404, a weight is assigned to each network interface of the hybrid device based, at least in part, on a throughput associated with the network interface. For example, the hybrid STP unit 106 can assign a weight to each network interface 108, 110, and 112 of the hybrid device 102. FIG. 4B illustrates example weights that can be assigned to a network interface depending and the type and throughput of the network interface. In some embodiments, a weight can be assigned to a network interface depending on the type of communication network to which the network interface couples the hybrid device 102, the type of the network interface of the hybrid device 102 (e.g., whether the network interface is an access point or a client station), the speed of the network interface, the throughput (e.g., PHY rate) achieved via the network interface, network topology, and other such factors. As depicted in FIG. 4B, in one implementation, the weight assigned to the network interface may be inversely proportional to the throughput associated with a network interface. In other words, a lower weight can be assigned to a network interface associated with a higher throughput to bias selection in favor of the network interface with the higher throughput. For example, a PLC interface with a 100 Mbps throughput may be assigned a lower weight as compared to a PLC interface that is unreachable (further discussed below in FIG. 5), thus biasing selection in favor of the PLC interface with the 100 Mbps throughput. As another example, a network interface that couples to an 802.11n network may be assigned a lower weight as compared to a network interface that couples to an 802.11a network. It is noted that in other embodiments, other suitable weights can be assigned to the network interfaces. The flow continues at block 406.

At block 406, the root interface of the hybrid device is selected based, at least in part, on the weights assigned to each of the network interfaces of the hybrid device. As described above in block 404 and FIG. 4B, a weight can be assigned to each network interface of the hybrid device (e.g., inversely proportional to the throughput associated with the network interface). In one embodiment, the hybrid STP unit 106 can select one network interface of the hybrid device 102 as the root interface of the hybrid device 102 using conventional STP operations based, at least in part, on the weights assigned to the network interfaces of the hybrid device 102. From block 406, the flow ends.

Figure 5:
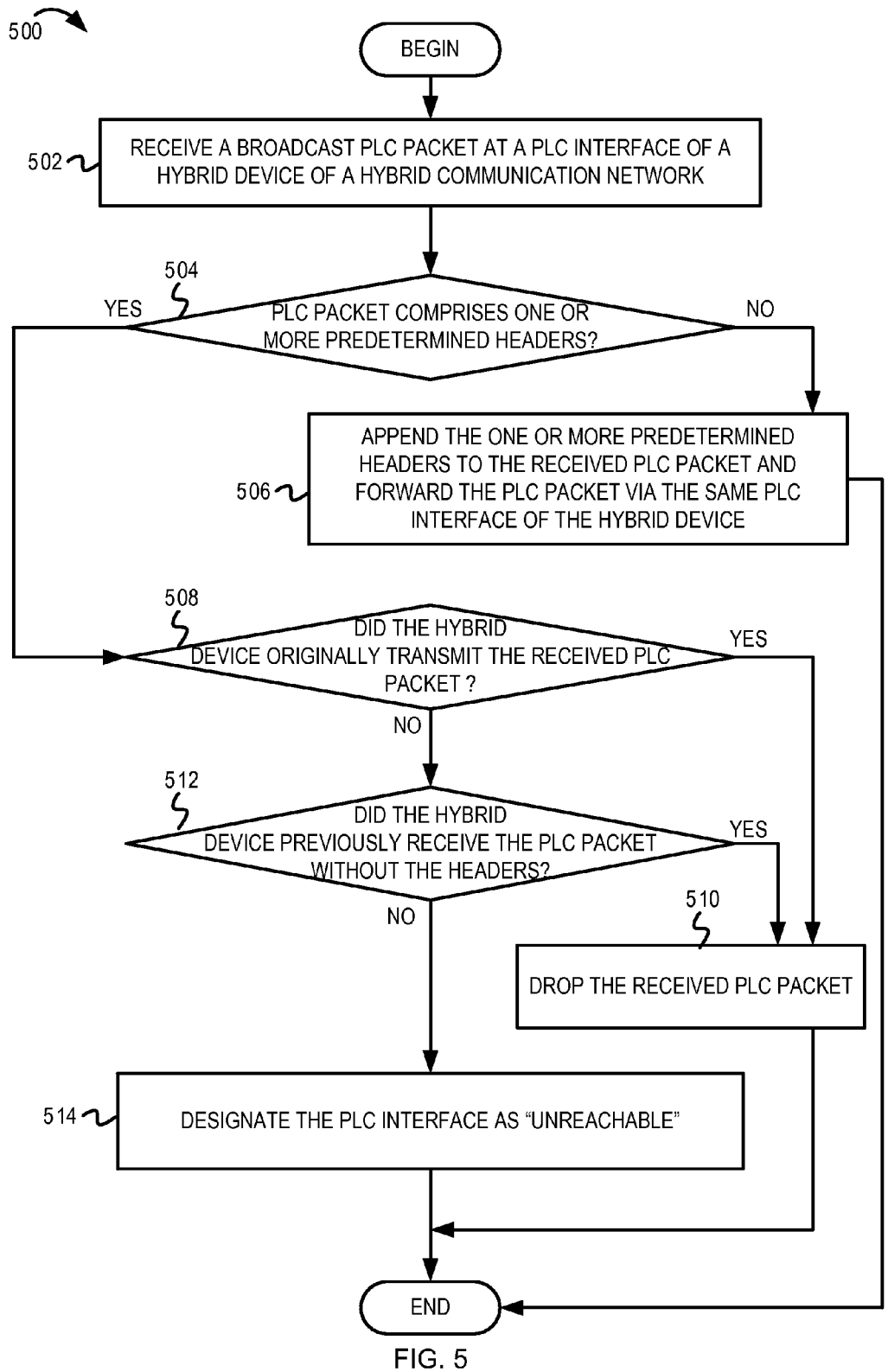
FIG. 5 is a flow diagram illustrating operations for weighting powerline communication interfaces of a hybrid device.

FIG. 5 is a flow diagram 500 illustrating operations for weighting powerline communication interfaces of a hybrid device. The flow 500 begins at block 502.

At block 502, a broadcast PLC packet is received at a PLC interface of a hybrid device of a hybrid communication network. For example, a HomePlug AV packet can be received at a HomePlug AV network interface of the hybrid device. In some embodiments, hybrid devices that comprise PLC interfaces may transmit broadcast PLC packets via the powerline medium to weight PLC interfaces (e.g., to aid in selecting the root interface) and to identify which of the PLC interfaces should be configured as relay and non-relay interfaces. A PLC packet transmitted by one of the hybrid devices in the hybrid communication network 100 may be received at the PLC interface 108 of the hybrid device 102. The flow continues at block 504.

At block 504, it is determined whether the received PLC packet comprises one or more predetermined headers that indicate that the PLC packet was forwarded by another PLC device. In other words, the presence of the predetermined headers can indicate that the hybrid device 102 did not receive the PLC packet directly from the source hybrid device (i.e., the hybrid device that originally transmitted the PLC packet). The presence of the predetermined headers can indicate that the hybrid device 102 received the PLC packet via a forwarding intermediate hybrid device. If it is determined that the received PLC packet does not comprise one or more predetermined headers, the flow continues at block 506. Otherwise, if it is determined that the received PLC packet comprises the one or more predetermined heads, the flow continues at block 508.

At block 506, the one or more predetermined headers are appended to the received PLC packet and the PLC packet including the appended predetermined headers is forwarded via the same PLC interface of the hybrid device. The flow moves from block 504 to block 506 if it is determined that the received PLC packet does not comprise the predetermined headers. The absence of the predetermined headers can indicate that the hybrid device 102 is connected to the source hybrid device and that the hybrid device 102 received the PLC packet directly from the source hybrid device. With reference to the example of FIG. 1, the hybrid STP unit 106 may receive the PLC packet via the PLC interface 108, determine that the received PLC packet does not comprise the predetermined headers, and append the predetermined headers to the received PLC packet. The hybrid device 102 can then retransmit the PLC packet including the appended predetermined headers via the same PLC interface 108 via which the PLC packet was received. This can ensure that the PLC packet is received by all hybrid devices on the PLC network even if the direct communication link between hybrid devices is broken (e.g., because of faulty wiring, noise, etc.). From block 506, the flow ends.

At block 508, it is determined whether the hybrid device originally transmitted the PLC packet. The flow moves from block 504 to block 508 if it is determined that the received PLC packet comprises the predetermined headers. As described above, the presence of the predetermined headers can indicate that the hybrid device 102 did not receive the PLC packet directly from the source hybrid device. If it is determined that the hybrid device 102 originally transmitted the PLC packet, the flow continues at block 510. Otherwise, if it is determined that the hybrid device 102 did not originally transmit the PLC packet, the flow continues at block 512.

At block 512, it is determined whether the hybrid device previously received the PLC packet without the predetermined headers. The flow 500 moves from block 508 to block 512 if the hybrid device 102 did not originally transmit (and did not source) the PLC packet. In other words, at block 512, the hybrid device 102 can determine whether it previously received the PLC packet directly from the source hybrid device. If it is determined that the hybrid device previously received the PLC packet without the predetermined headers, the flow continues at block 510. Otherwise, the flow continues at block 514.

At block 510, the received PLC packet is dropped at the hybrid device. The flow 500 moves from block 508 to block 510 if the hybrid device 102 originally transmitted the PLC packet (received at block 502). The flow 500 also moves from block 512 to block 510 if the hybrid device 102 previously received the PLC packet without the predetermined headers. The hybrid device 102 can drop/discard the PLC packet at the hybrid device 102. From block 510, the flow ends.

At block 514, the PLC interface is designated as "unreachable." The flow 500 moves from block 512 to block 514 if the hybrid device 102 did not previously receive the PLC packet without the predetermined headers. For example, the hybrid STP unit 106 can designate the PLC interface as "unreachable" by assigning a predetermined weight to the PLC interface. In one implementation, as depicted in FIG. 4B, the hybrid STP unit 106 can assign the PLC interface a weight of 1000 to indicate that the PLC interface is unreachable. Designating the PLC interface as "unreachable" can serve to bias against selection of the PLC interface as the root interface. As described above, the weight assigned to the PLC interface can enable the hybrid STP unit 106 to determine whether to configure the PLC interface as a root interface, whether to transmit packets via the PLC interface, etc. From block 514, the flow ends.

It should be noted that although FIG. 5 describes operations for weighting PLC interfaces of a hybrid device, embodiments are not so limited. In other embodiments, the operations of FIG. 5 can be executed to weight other suitable types of shared network interfaces (e.g., Ethernet interfaces, MoCA interfaces, etc.) of the hybrid device 102.

FIG. 6 is a flow diagram 600 illustrating example operations for determining how to forward a packet received at a hybrid device. The flow 600 begins at block 602.

At block 602, a packet is received at an ingress interface of a hybrid device. With reference to the example of FIG. 1, an ingress interface 108 of the hybrid device 102 may receive a broadcast packet, a multicast packet, or an unknown unicast packet. The flow continues at block 604.

At block 604, it is determined whether a forwarding bit value of "1" is assigned to the ingress interface. As described above in FIGS. 1 and 2, if the ingress interface 108 is assigned a forwarding bit value of "1," this can indicate that the received packet (e.g., broadcast packet, unmanaged multicast packet, or unknown unicast packet) should be forwarded via other network interfaces of the hybrid device 102. If it is determined that a forwarding bit value of "0" is assigned to the ingress interface 108 the flow continues at block 606.

Otherwise, if it is determined that a forwarding bit value of "1" is assigned to the ingress interface 108, the flow continues at block 608.

At block 606, the received packet is discarded at the hybrid device. The flow 600 moves from block 604 to block 606 if the hybrid STP unit 106 determines that a forwarding bit value of "0" is assigned to the ingress interface 108. In one example, the hybrid STP unit 106 may drop the received packet if a forwarding bit value of "0" is assigned to the ingress interface 108. It is noted that in other embodiments, if a forwarding bit value of "0" is assigned to the ingress interface 108, the hybrid STP unit 106 may determine not to forward the received packet and may provide the received packet to upper protocol layers of the hybrid device 102 for subsequent processing. The upper protocol layers can execute one or more operations to determine whether the packet was previously received, whether to discard the received packet, and whether/how to process the received packet. From block 606, the flow ends.

At block 608, it is determined whether the ingress interface is a non-relay interface. The flow 600 moves from block 604 to block 608 if a forwarding bit value of "1" is assigned to the ingress interface 108. As described above in FIGS. 1 and 2, whether the ingress interface 108 is a relay interface or a non-relay interface can influence the selection of one or more exit interfaces of the hybrid device via which the received packet will be forwarded. If it is determined that the ingress interface 108 is a non-relay interface, the flow continues at block 610. Otherwise, if it is determined that the ingress interface 108 is a relay interface, the flow continues at block 612.

At block 610, the received packet is forwarded via the relay interfaces of the hybrid device. The flow 600 moves from block 608 to block 610 if the hybrid STP unit 106 determines that the ingress interface 108 is a non-relay interface and that the forwarding bit value of "1" is assigned to the ingress interface 108. The hybrid STP unit 106 can identify the relay interfaces of the hybrid device 102 that are assigned a forwarding bit value of "1." The hybrid STP unit 106 can forward the received packet via those relay interfaces that are assigned a forwarding bit value of "1." The hybrid STP unit 106 may not forward the received packet via other non-relay interfaces of the hybrid device 102. From block 610, the flow ends.

At block 612, the received packet is forwarded via other relay interfaces and one non-relay interface of the hybrid device. The flow 600 moves from block 608 to block 612 if the hybrid STP unit 106 determines that the ingress interface is a relay interface and that a forwarding bit value of "1" is assigned to the ingress interface. The hybrid STP unit 106 can identify the other relay interfaces (if any) of the hybrid device 102 that are assigned a forwarding bit value of "1." The hybrid STP unit 106 can also identify one representative non-relay interface (typically the root interface) of the hybrid device 102 that is assigned a forwarding bit value of "1." The hybrid STP unit 106 can forward the packet via the other relay interfaces and the representative non-relay interface that are assigned a forwarding bit value of "1." It is noted that the hybrid STP unit 106 may forward the packet via only one of the non-relay interfaces of the hybrid device 102. From block 612, the flow ends.

It should be understood that FIGS. 1-6 are examples meant to aid in understanding embodiments and should not be used to limit embodiments or limit scope of the claims. Embodiments may perform additional operations, fewer operations, operations in a different order, operations in parallel, and some operations differently. In some embodiments, the hybrid device may or may not implement the operations of FIGS. 3 and 4A. For example, the root bridge of the hybrid communication network 100 and the root interface of the hybrid device 102 can be selected using other suitable techniques. It should be noted that the hybrid STP operations may be employed in a hybrid communication network for determining how to route broadcast packets, unmanaged multicast packets, and unknown unicast packets. The hybrid STP operations may not be used to determine how to route unicast packets with known destination device addresses.

It should be noted that in some embodiments, on receiving a unicast packet, the hybrid device 102 can determine whether the received unicast packet is intended for the hybrid device 102. If the received unicast packet is intended for the hybrid device 102, the received packet can be provided to upper protocol layers for subsequent processing. If the hybrid device 102 determines to forward the received packet, one or more forwarding tables can be accessed to determine an exit/forwarding network interface based on knowledge of the destination device. If the hybrid device 102 is unable to determine the exit network interface, the received packet can be considered an unknown unicast packet and can be forwarded in accordance with operations described above in FIGS. 1 and 6. In some embodiments, if the hybrid device 102 determines that both the ingress interface and the exit interface for the received unicast packet are non-relay interfaces, the hybrid device 102 may drop the received unicast packet.

In some embodiments, executing the hybrid STP in the hybrid communication network 100 can prevent failure of the hybrid communication network 100 in case one of the network interfaces of a hybrid device fails (and disrupts connectivity between hybrid devices in the hybrid communication network 100. For example, if the PLC interface 108 (the root interface) of the hybrid device 102 fails, there is no direct connection between the hybrid devices 102 and 114. To ensure connectivity between the hybrid devices 102 and 114, the WLAN interface 110 of the hybrid device 102 (previously configured as the alternate root interface) is configured as the root interface of the hybrid device 102. The inoperative PLC interface 108 is configured as the alternate root interface. Furthermore, the forwarding bits associated with the PLC interface 108 and the WLAN interface 110 can also be updated. The forwarding bit associated with the PLC interface 108 can be switched to "0" to indicate that the PLC interface 108 is no longer the root interface. The forwarding bit associated with the WLAN interface 110 can be switched to "1" to indicate that the WLAN interface 110 is the new root interface. As described above, because the PLC interface 108 and the WLAN interface 110 are non-relay interfaces, any messages intended for the hybrid device 102 will be received at the WLAN interface 110 (with the forwarding bit set to "1") and will not be received at the PLC interface 108 (with the forwarding bit set to "0"). The hybrid device 102 can now receive messages from the hybrid device 114 via the hybrid device 122. In other words, messages transmitted via the PLC interface 116 of the hybrid device 114 will be received at the PLC interface 126 of the hybrid device 122; the message will be forwarded via the WLAN interface 128 of the hybrid device 122 and will be received at the WLAN interface 110 of the hybrid device 102. It should be noted that if the hybrid device 102 comprises more than one alternate root interface, each alternate root interface can be weighted (e.g., based on executing the operations of FIG. 4A, FIG. 4B, and/or FIG. 5) and the alternate root interface with the best weight can be configured as the new root interface.

In some embodiments, the hybrid STP unit 106 can, either continuously or periodically, monitor the state of the hybrid device 102 and the hybrid communication network 100 to ensure that the selected root interface, alternate root interface, and designated root interfaces are still valid/optimal for the hybrid device 102. For example, the hybrid STP unit 106 may determine that the previously determined root interface of the hybrid device 102 has been disabled. Accordingly, the hybrid STP unit 106 can re-execute STP operations to determine a new root interface, at least one new alternate root interface, and/or at least one designated interface. As another example, the hybrid STP unit 106 may determine that a new network interface has been added to the hybrid device 102 or that the weights assigned to each device category (see FIG. 4B) have been updated. Accordingly, the hybrid STP unit 106 can re-execute the STP operations to determine a new root interface, at least one new alternate root interface, and/or at least one designated interface for the hybrid device 102.

It should be noted that in a WLAN, the WLAN client stations are typically connected with a WLAN access point (or another coordinating device). Typically, all communications between any two WLAN client stations pass through the WLAN access point. For example, for a source WLAN client station to communicate with a destination WLAN client station, the source WLAN client station can transmit packets (intended for the destination WLAN client station) to the WLAN access point and the WLAN access point can forward these packets to the destination WLAN client station. Accordingly, if the WLAN access point is selected as the root bridge, then each WLAN client device in the communication network is only one hop away from any other WLAN client device in the communication network. Alternately, if one of the WLAN client devices is selected as the root bridge, the each WLAN client device in the communication network is two hops away from any other WLAN client device in the communication network. For example, for a source WLAN client station to communicate with a destination WLAN client station, the source WLAN client station can transmit packets (intended for the destination WLAN client station) to the root WLAN client station, the root WLAN client station can forward the packets to the WLAN access point, and the WLAN access point can then forward the packets to the destination WLAN client station. This can impair the transmission rate, latency, and performance of the communication network. Accordingly, as described above, the hybrid device may be assigned a lower weight if the hybrid device comprises an interface that is a WLAN client station; while the hybrid device may be assigned a comparatively higher weight if the hybrid device comprises an interface that is a WLAN access point. Furthermore, if a WLAN access point and a WLAN client station have the same priority level, the WLAN access point may be selected as the root bridge. Furthermore, in selecting the root interface and the designated interface of a hybrid device, if two network interfaces of the hybrid device have the same interface weight, the network interface that connects to the WLAN access point may be designated as the root interface.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
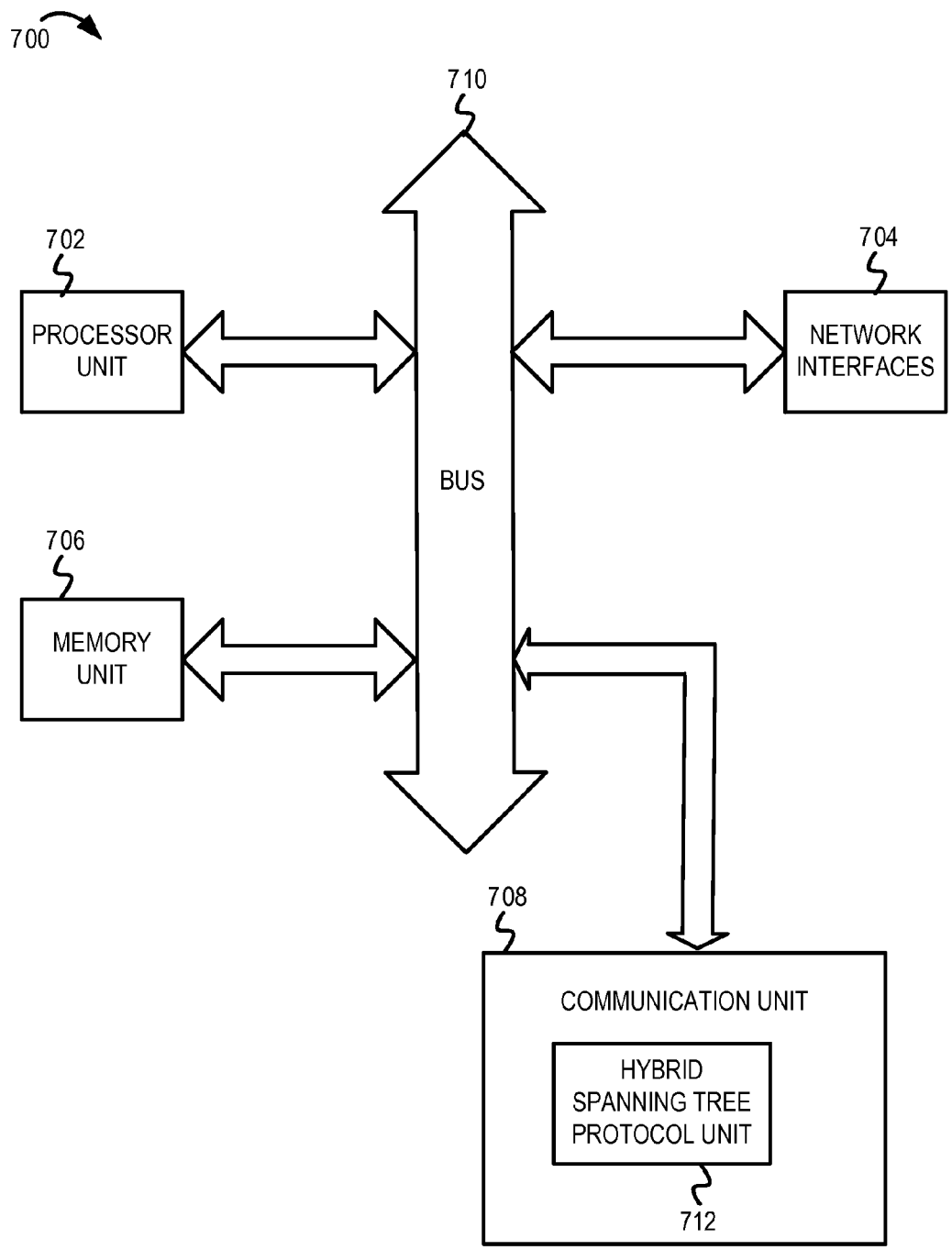
FIG. 7 is a block diagram of one embodiment of an electronic device including a hybrid spanning tree protocol for hybrid communication networks.

FIG. 7 is a block diagram of one embodiment of an electronic device 700 including a hybrid spanning tree protocol for hybrid communication networks. In some implementations, the electronic device 700 may be one of a desktop computer, laptop computer, a tablet computer, a mobile phone, a smart appliance, a powerline communication device, a gaming console, network bridging devices, an access point, or other electronic systems comprising a hybrid communication unit configured to communicate across multiple communication networks. The electronic device 700 includes a processor unit 702 (possibly including multiple processors, multiple cores, multiple nodes, and/or implementing multi-threading, etc.). The electronic device 700 includes a memory unit 706. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 700 also includes a bus 710 (e.g., PCI, ISA, PCI-Express, HyperTransport®, InfiniBand®, NuBus, AHB, AXI, etc.), and network interfaces 704 that include at least one of a wireless network interface (e.g., a WLAN interface, a Bluetooth® interface, a WiMAX interface, a ZigBee® interface, a Wireless USB interface, etc.) and a wired network interface (e.g., a PLC interface, an Ethernet interface, etc.). In some implementations, the electronic device 700 can comprise a plurality of network interfaces—each of which couples the electronic device 700 to a different communication network. For example, the electronic device 700 can comprise a PLC interface, an Ethernet interface, and a WLAN interface that couple the electronic device 700 with a powerline communication network, Ethernet, and a wireless local area network respectively.

The electronic device 700 also includes a communication unit 708. The communication unit 708 comprises a hybrid STP unit 712. The hybrid STP unit 712 can implement functionality to use configure each network interface of the electronic device 700 as a relay interface or a non-relay interface and to set a forwarding bit associated with the network interface as described above with reference to FIGS. 1-5. The hybrid STP unit 712 can also implement functionality to determine whether/how to forward certain types of packets (e.g., broadcast packets, unmanaged multicast packets, unknown unicast packets) based, at least in part, on the forwarding bit associated with an ingress interface and on whether the ingress interface is a relay or non-relay interface, as described above in FIGS. 1 and 6.

Any one of these functionalities may be partially (or entirely) implemented in hardware and/or on the processor unit 702. For example, the functionality may be implemented with an application specific integrated circuit, in logic implemented in the processor unit 702, in a co-processor on a peripheral device or card, etc. Further, realizations may include fewer or additional components not illustrated in FIG. 7 (e.g., video cards, audio cards, additional network interfaces, peripheral devices, etc.). For example, in addition to the processor unit 702 coupled with the bus 710, the communication unit 708 may comprise at least one additional processor unit. The processor unit 702, the memory unit 706, and the network interfaces 704 are coupled to the bus 710. Although illustrated as being coupled to the bus 710, the memory unit 706 may be coupled to the processor unit 702.

While the embodiments are described with reference to various implementations and exploitations, it will be understood that these embodiments are illustrative and that the scope of the inventive subject matter is not limited to them. In general, a hybrid spanning tree protocol for hybrid communication networks as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for implementing relay and non-relay interfaces in a hybrid communication network, the method comprising:
    determining whether a first interface of a first network device of the hybrid communication network is a relay interface or a non-relay interface based, at least in part, on executing a spanning tree protocol operation at the first network device, wherein the hybrid communication network comprises a first network using a first networking technology comprising a member of the group consisting of wireless local area network (WLAN), Ethernet, powerline communication (PLC), Multimedia over Coax Alliance (MoCA), Bluetooth, WiMAX, and ZigBee and a second network using a second networking technology comprising a member of the group consisting of WLAN, Ethernet, PLC, MoCA, Bluetooth, WiMAX, and ZigBee;
    forwarding a first packet, received at the first interface, via at least one other relay interface of the first network device and via a single non-relay interface of the first network device in response to determining that the first interface is a relay interface; and
    forwarding the first packet via at least one relay interface of the first network device and not forwarding the first packet via a non-relay interface of the first network device in response to determining that the first interface is a non-relay interface.

2. The method of claim 1, wherein the identifying further comprises:
    determining a root interface and a designated interface of the first network device in response to executing the spanning tree protocol operation;
    determining that the root interface and another interface are non-relay interfaces, wherein the non-relay interfaces operate as a single virtual interface; and
    determining that the designated interface is a relay interface.

3. The method of claim 1, further comprising:
    determining to broadcast a second packet from the first network device; and
    broadcasting the second packet via a non-relay interface of the first network device and determining not to broadcast the second packet via other non-relay interfaces of the first network device.

4. The method of claim 1, further comprising:
    determining whether a first value is assigned to a forwarding bit associated with the first interface;
    in response to determining that the first value is assigned to the forwarding bit,
        forwarding the first packet via at least one other interface of the first network device based, at least in part, on whether the first interface is a relay interface or a non-relay interface; and
    in response to determining that the first value is not assigned to the forwarding bit,
        determining not to forward the first packet and determining to discard the first packet at the first network device.

5. The method of claim 1, further comprising:
    determining that a root interface of the first network device is a non-relay interface and assigning a first value to a forwarding bit associated with the root interface;
    determining that an alternate root interface of the first network device is a non-relay interface and assigning a second value to a forwarding bit associated with the alternate root interface; and
    determining that a designated interface of the first network device is a relay interface and assigning the first value to a forwarding bit associated with the designated interface;
    forwarding the first packet via the root interface and via the designated interface based, at least in part, on determining that the first interface is a relay interface and determining that the first value is assigned to the forwarding bit associated with the root interface and the forwarding bit associated with the designated interface; and
    determining not to forward the first packet via the alternate root interface, based at least in part, on determining that the first interface is a relay interface and determining that the second value is assigned to the forwarding bit associated with the alternate root interface.

6. The method of claim 5, further comprising:
    forwarding the first packet via the designated interface based, at least in part, on determining that the first interface is a non-relay interface and determining that the first value is assigned to the forwarding bit associated with the designated interface; and
    determining not to forward the first packet via the alternate root interface, based at least in part, on determining that the first interface is a non-relay interface and determining that the second value is assigned to the forwarding bit associated with the alternate root interface.

7. The method of claim 1, wherein said executing the spanning tree protocol operation further comprises determining a root bridge of the hybrid communication network.

8. The method of claim 7, wherein said
determining the root bridge comprises:
    determining a first priority level for the first network device and a second priority level for a second network device of the hybrid communication network based, at least in part, on at least one member of a group consisting of:

determining whether a gateway is detected on at least one interface of a corresponding network device,
whether the corresponding network device is a wireless local area network access point, and
whether the corresponding network device is a coordinator device; and
selecting one of the first network device and the second network device as the root bridge based, at least in part, on the first priority level and the second priority level.

9. The method of claim 1, further comprising:
weighting the first interface and a second interface of the first network device based, at least in part, on at least one member of a group consisting of:
a throughput associated with a corresponding interface,
a type of communication network to which the corresponding interface couples the first network device, and
a device type of the first network device; and
selecting one of the first interface and the second interface as a root interface of the first network device based, at least in part, on a first weight assigned to the first interface and a second weight assigned to the second interface.

10. The method of claim 9, further comprising:
updating at least one of the first weight and the second weight; and
re-executing the spanning tree protocol operation at the first network device.

11. The method of claim 1, wherein, in response to receiving the first packet, the method further comprises:
determining whether the first packet comprises a field that indicates that the first packet was not directly received from a second network device that generated the first packet; and
in response to determining that the first packet comprises the field,
determining whether the first packet was originally generated by the first network device.

12. The method of claim 11, further comprising:
adding the field to the first packet and forwarding the first packet via the first interface in response to determining that the first packet does not comprise the field.

13. The method of claim 11, further comprising:
assigning a predefined weight to the first interface to negatively bias the first interface in response to determining that the first packet was not originally generated by the first network device; and
discarding the first packet at the first network device and determining not to forward the first packet via other interfaces of the first network device in response to determining that the first packet was originally generated by the first network device.

14. The method of claim 1, wherein the first packet is one of a broadcast packet, an unmanaged multicast packet, and an unknown unicast packet.

15. The method of claim 1, wherein the first network device is a hybrid device that comprises two or more network interfaces.

16. A first network device comprising:
a first interface communicably coupled to a hybrid communication network comprising a first network using a first networking technology comprising a member of the group consisting of wireless local area network (WLAN), Ethernet, powerline communication (PLC), Multimedia over Coax Alliance (MoCA), Bluetooth, WiMAX, and ZigBee and a second network using a second networking technology comprising a member of the group consisting of WLAN, Ethernet, PLC, MoCA, Bluetooth, WiMAX, and ZigBee; and
a hybrid spanning tree protocol (STP) unit coupled to the first interface, the hybrid STP unit to:
determine whether the first interface is a relay interface or a non-relay interface based, at least in part, on executing a spanning tree protocol operation at the first network device;
forward a first packet, received at the first interface, via at least one other relay interface of the first network device and via a single non-relay interface of the first network device in response to determining that the first interface is a relay interface; and
forward the first packet via at least one relay interface of the first network device and not forwarding the first packet via a non-relay interface of the first network device in response to determining that the first interface is a non-relay interface.

17. The first network device of claim 16, wherein the hybrid STP unit is further to:
determine a root interface, an alternate root interface, and a designated interface of the first network device in response to executing the spanning tree protocol operation;
determine that the root interface and the alternate root interface are non-relay interfaces, wherein the non-relay interfaces operate as a single virtual interface; and
determine that the designated interface is a relay interface.

18. The first network device of claim 16, wherein the hybrid STP unit is further to:
determine to broadcast a second packet from the first network device on the hybrid communication network; and
broadcast the second packet via a non-relay interface of the first network device and determine not to broadcast the second packet via other non-relay interfaces of the first network device.

19. The first network device of claim 16, wherein the hybrid STP unit is further to:
determine whether a first value is assigned to a forwarding bit associated with the first interface;
in response to determining that the first value is assigned to the forwarding bit, the hybrid STP unit is to determine whether the first interface is a relay interface or a non-relay interface, and
forward the first packet via at least one other interface of the first network device based, at least in part, on whether the first interface is a relay interface or a non-relay interface; and
in response to determining that the first value is not assigned to the forwarding bit, determine not to forward the first packet and determine to discard the first packet at the first network device.

20. The first network device of claim 16, wherein the hybrid STP unit is further to:
determine that a root interface of the first network device is a non-relay interface and assign a first value to a forwarding bit associated with the root interface;
determine that an alternate root interface of the first network device is a non-relay interface and assign a second value to a forwarding bit associated with the alternate root interface; and
determine that a designated interface of the first network device is a relay interface and assign the first value to a forwarding bit associated with the designated interface;
forward the first packet via the root interface and via the designated interface based, at least in part, on determining that the first interface is a relay interface and determining that the first value is assigned to the forwarding bit associated with the root interface and the forwarding bit associated with the designated interface; and
determine not to forward the first packet via the alternate root interface, based at least in part, on determining that the first interface is a relay interface and determining that the second value is assigned to the forwarding bit associated with the alternate root interface.

21. The first network device of claim 20, wherein the hybrid STP unit is further to:
forward the first packet via the designated interface based, at least in part, on determining that the first interface is a non-relay interface and determining that the first value is assigned to the forwarding bit associated with the designated interface; and
determine not to forward the first packet via the alternate root interface, based at least in part, on determining that the first interface is a non-relay interface and determining that the second value is assigned to the forwarding bit associated with the alternate root interface.

22. The first network device of claim 16, wherein the hybrid STP unit is further to:
determine a first priority level for the first network device and a second priority level for a second network device of the hybrid communication network based, at least in part, on at least one member of a group consisting of:
determining whether a gateway is detected on at least one interface of a corresponding network device,
whether the corresponding network device is a wireless local area network access point, and
whether the corresponding network device is a coordinator device; and
select one of the first network device and the second network device as a root bridge of the hybrid communication network based, at least in part, on the first priority level and the second priority level.

23. The first network device of claim 16, wherein, the hybrid STP unit is further to:
determine whether the first packet comprises a field that indicates that the first packet was not directly received from another network device that generated the first packet; and
in response to determining that the first packet comprises the field,
determine whether the first packet was originally generated by the first network device.

24. The first network device of claim 23, wherein the hybrid STP unit is further to:
add the field to the first packet and forward the first packet via the first interface in response to determining that the first packet does not comprise the field.

25. The first network device of claim 23, wherein the hybrid STP unit is further to:
assign a predefined weight to the first interface to negatively bias the first interface in response to determining that the first packet was not originally generated by the first network device; and
discard the first packet at the first network device and determine not to forward the first packet via other interfaces of the first network device in response to determining that the first packet was originally generated by the first network device.

26. A non-transitory machine-readable storage medium having instructions stored therein, which when executed by a processor cause the processor to perform operations that comprise:
determining whether a first interface of a first network device of a hybrid communication network is a relay interface or a non-relay interface based, at least in part, on executing a spanning tree protocol operation at the first network device, wherein the hybrid communication network comprises a first network using a first networking technology comprising a member of the group consisting of WLAN, Ethernet, PLC, MoCA, Bluetooth, WiMAX, and ZigBee and a second network using a second networking technology comprising a member of the group consisting of WLAN, Ethernet, PLC, MoCA, Bluetooth, WiMAX, and ZigBee;
forwarding a first packet, received at the first interface, via at least one other relay interface of the first network device and via a single non-relay interface of the first network device in response to determining that the first interface is a relay interface; and
forwarding the first packet via at least one relay interface of the first network device and not forwarding the first packet via a non-relay interface of the first network device in response to determining that the first interface is a non-relay interface.

27. The non-transitory machine-readable storage medium of claim 26, wherein the identifying operation further comprises:
determining a root interface and a designated interface of the first network device in response to executing the spanning tree protocol operation;
determining that the root interface and another interface are non-relay interfaces, wherein the non-relay interfaces operate as a single virtual interface; and
determining that the designated interface is a relay interface.

28. The non-transitory machine-readable storage medium of claim 26, wherein the operations further comprise:
determining to broadcast a second packet from the first network device; and
broadcasting the second packet via a non-relay interface of the first network device and determining not to broadcast the second packet via other non-relay interfaces of the first network device.

29. The non-transitory machine-readable storage medium of claim 26, wherein the operations further comprise:
determining whether a first value is assigned to a forwarding bit associated with the first interface;
in response to determining that the first value is assigned to the forwarding bit,
forwarding the first packet via at least one other interface of the first network device based, at least in part, on whether the first interface is a relay interface or a non-relay interface; and
in response to determining that the first value is not assigned to the forwarding bit,
determining not to forward the first packet and determining to discard the first packet at the first network device.

30. The non-transitory machine-readable storage medium of claim 26, wherein the operations further comprise:
determining that a root interface of the first network device is a non-relay interface and assigning a first value to a forwarding bit associated with the root interface;
determining that an alternate root interface of the first network device is a non-relay interface and assigning a second value to a forwarding bit associated with the alternate root interface; and determining that a designated interface of the first network device is a relay interface and assigning the first value to a forwarding bit associated with the designated interface;

forwarding the first packet via the root interface and via the designated interface based, at least in part, on determining that the first interface is a relay interface and determining that the first value is assigned to the forwarding bit associated with the root interface and the forwarding bit associated with the designated interface; and determining not to forward the first packet via the alternate root interface, based at least in part, on determining that the first interface is a relay interface and determining that the second value is assigned to the forwarding bit associated with the alternate root interface.

31. The non-transitory machine-readable storage medium of claim 26, wherein the operations further comprise:

determining a first priority level for the first network device and a second priority level for a second network device of the hybrid communication network based, at least in part, on at least one member of a group comprising determining whether a gateway is detected on at least one interface of a corresponding network device, whether the corresponding network device is a wireless local area network access point, and whether the corresponding network device is a coordinator device; and selecting one of the first network device and the second network device as a root bridge based, at least in part, on the first priority level and the second priority level.

32. The non-transitory machine-readable storage medium of claim 26, wherein, in response to receiving the first packet at the first interface, the operations further comprise:

determining that the first packet comprises a field that indicates that the first packet was not directly received from a second network device that generated the first packet;

determining whether the first packet was originally generated by the first network device;

assigning a predefined weight to the first interface to negatively bias the first interface in response to determining that the first packet was not originally generated by the first network device; and discarding the first packet at the first network device and determining not to forward the first packet via other interfaces of the first network device in response to determining that the first packet was originally generated by the first network device.

* * * * *